US006253670B1

United States Patent
Gingras

(10) Patent No.: US 6,253,670 B1
(45) Date of Patent: Jul. 3, 2001

(54) APPARATUS FOR PEELING AND OPTIONALLY CUTTING VEGETABLES

(76) Inventor: Michel Gingras, 224 De Gaulle, Ville Lorraine, Quebec (CA), J6Z 4P3

( * ) Notice: Subject to any disclaimer, the term of this patent is extended or adjusted under 35 U.S.C. 154(b) by 0 days.

(21) Appl. No.: 09/465,588

(22) Filed: Dec. 17, 1999

(30) Foreign Application Priority Data

Jan. 8, 1999 (CA) .................................................. 2256795
Nov. 19, 1999 (CA) .................................................. 2289241

(51) Int. Cl.[7] .............................. A23N 7/00; A23N 7/04; A23N 7/10
(52) U.S. Cl. ................................ 99/589; 99/584; 99/590; 99/591
(58) Field of Search ..................... 99/538–541, 584–591, 99/623, 643; 426/481–483

(56) References Cited

U.S. PATENT DOCUMENTS

| 4,212,237 | * | 7/1980 | Hsu | 99/589 |
| 4,430,931 | * | 2/1984 | Hsu | 99/589 |
| 4,446,782 | * | 5/1984 | Black | 99/589 |
| 4,738,195 | * | 4/1988 | Berube et al. | 99/591 X |
| 5,146,681 | * | 9/1992 | Haghkar | 99/589 X |
| 5,669,293 | * | 9/1997 | Sommer | 99/589 |

FOREIGN PATENT DOCUMENTS

| 732258 | 1/1943 | (DK) . |
| 2256899 | 6/1974 | (DK) . |
| 0509181 | 10/1992 | (EP) . |
| 1018305 | 12/1999 | (EP) . |

* cited by examiner

Primary Examiner—Timothy F. Simone
(74) Attorney, Agent, or Firm—Darby & Darby

(57) ABSTRACT

An apparatus is disclosed for peeling vegetables of a round, oval or elongated shape such as cucumbers, turnips, carrots or potatoes. The apparatus has a frame defining a hole sized to receive and let pass the vegetable to be peeled. A given number of knives is mounted onto the frame in such a manner as to be radially slidable toward the center of the hole. The knives are distributed in an equal manner all around the frame and each comprises a blade extending tangentially within the hole so as to peel an adjacent part of the vegetable introduced into and pushed through the hole. Springs are provided for applying in a permanent manner a radial force onto the knives in order to push the knives toward the center of the hole. This apparatus permits to peel vegetables in a single movement or with a minimal number of movements. A base may be provided to hold the frame vertically onto a table.

10 Claims, 8 Drawing Sheets

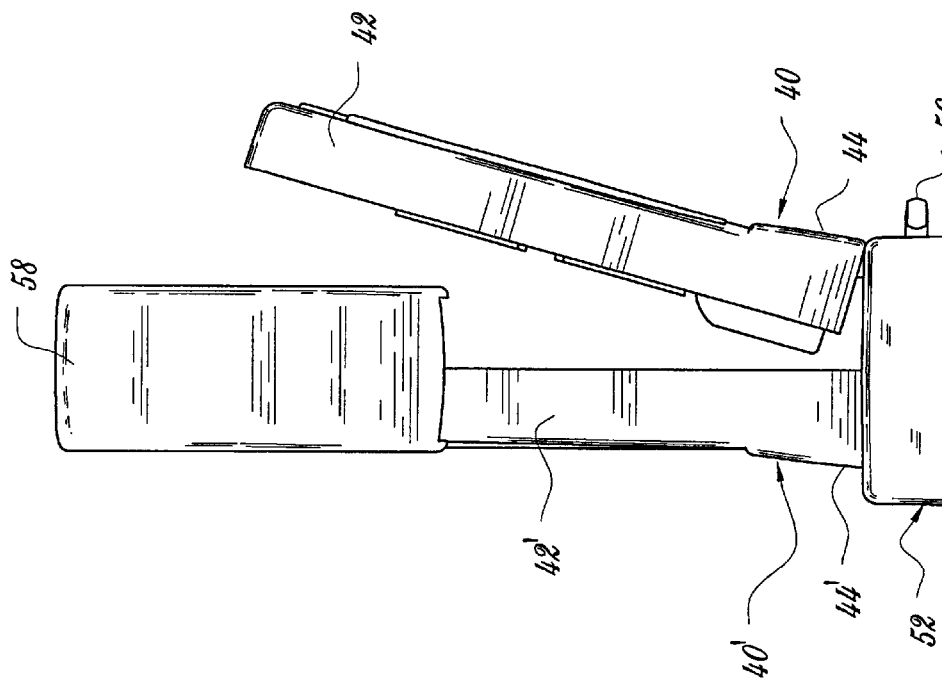
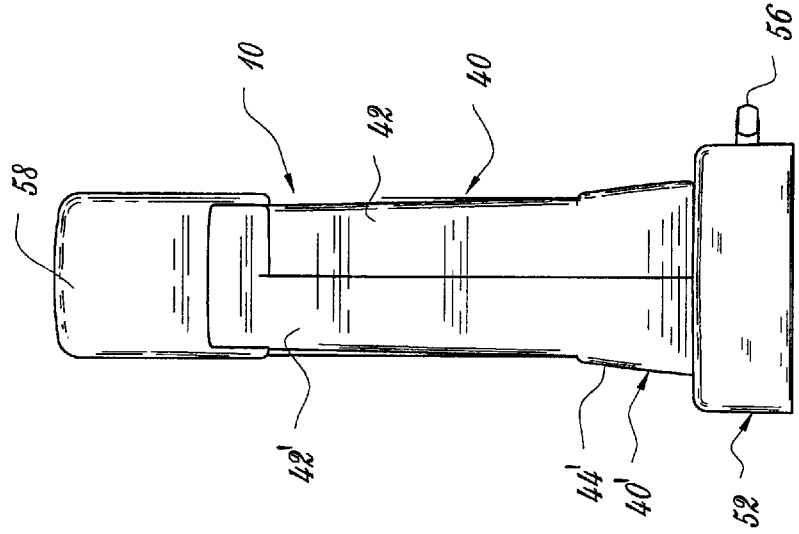

APPARATUS FOR PEELING AND OPTIONALLY CUTTING VEGETABLES

FIELD OF THE INVENTION

The present invention relates to a kitchen utensil, and more particularly to an apparatus for peeling vegetables of elongated, oval or round shape, such as cucumbers, squashes or turnips, carrots, potatoes and the like.

The invention also relates to an apparatus of the type mentioned hereinabove, which further includes, in an optional manner, means for cutting the vegetables while they are peeled.

BRIEF DESCRIPTION OF THE PRIOR ART

Traditionally, knives are used for peeling vegetables. These knives comprise the handle from which project a blade having one or more longitudinal slots. The blade is usually straight or slightly curved when seen in cross-section. To peel a vegetable or a fruit with such a knife, it is usually necessary to cut the skin of the vegetable in the form of thin bands. Such implies a plurality of repetition peeling movements by the user.

SUMMARY OF THE INVENTION

The object of the invention is to provide an apparatus for peeling vegetables of a round, oval or elongated shape, which apparatus comprises:

a frame defining a hole provided with a center, the hole being sized to receive and let pass the vegetable to be peeled;

a given number of knives mounted onto the frame in such a manner as to be radially slidable toward the center of the hole, the knives being distributed in an equal manner all around the frame and each comprising a blade extending tangentially within the hole so as to peel an adjacent part of the vegetable introduced into and pushed through the hole; and springs for applying in a permanent manner a radial force onto the knives in order to push the knives toward the center of the hole.

The apparatus according to the invention of which several preferred embodiments will be disclosed hereinafter, is very simple in construction and use. It permits to peel vegetables in a single movement or with a minimal number of movements. This apparatus also permits, in an optional manner, to cut the vegetable while it is peeled.

BRIEF DESCRIPTION OF THE DRAWINGS

FIGS. 7a and 7b are side elevational views of the apparatus shown in FIGS. 4 and 5, with their shells in close and open positions, respectively.

For the sake of simplicity, the same structural elements of the various preferred embodiments shown in the accompanying drawings have been identified with the same reference numerals in the drawings and the following description.

DESCRIPTION OF SEVERAL PREFERRED EMBODIMENTS OF THE INVENTION

Figure 1:
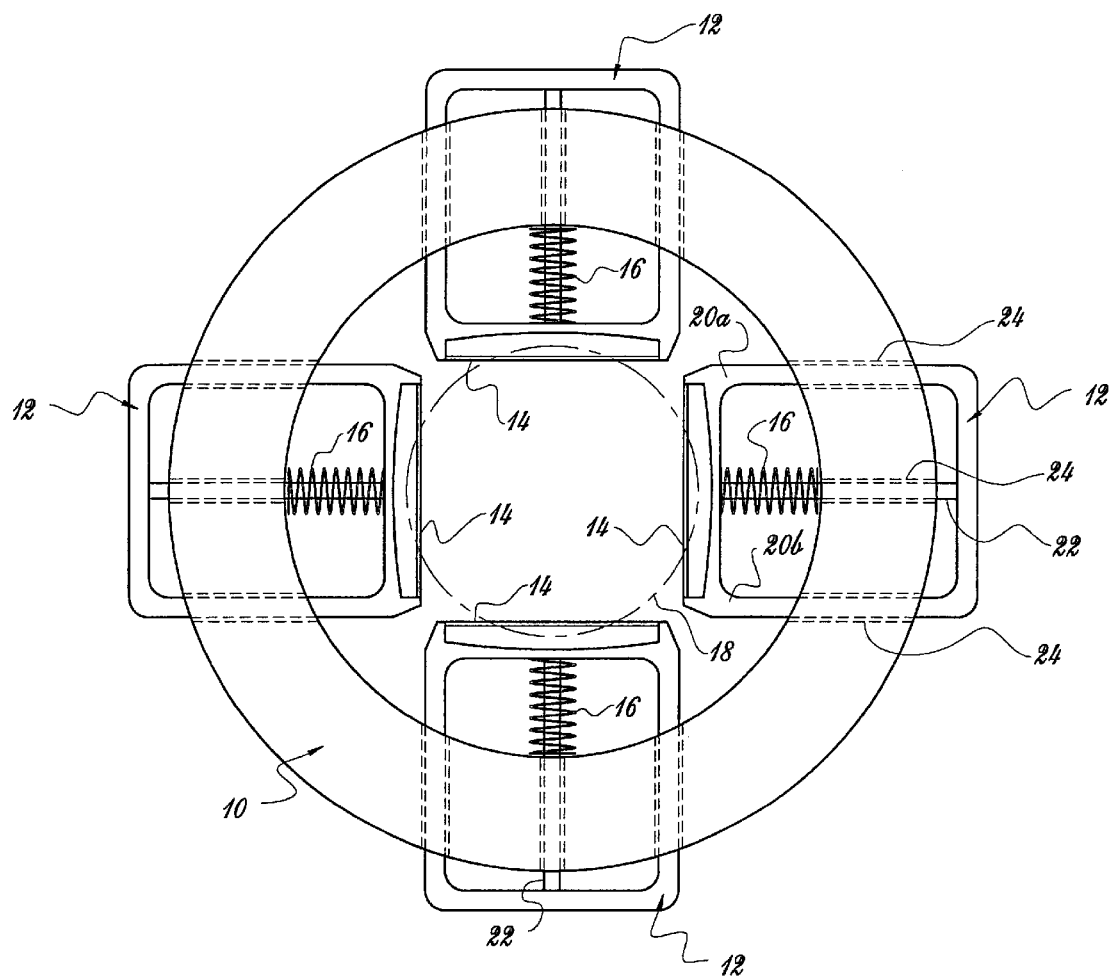
FIG. 1 is a front perspective view of an apparatus for peeling vegetables according to a first preferred embodiment of the invention, comprising a single ring-shaped frame supporting four knives.

FIG. 1 shows an apparatus for peeling vegetables according to a preferred embodiment of the invention. This apparatus comprises the ring-shaped frame 10 defining a hole around which are mounted four knives 12 positioned symmetrically at 90° from each other. The knives 12 extend in the same plane as the frame 10 and are mounted in such a manner as to be radially movable towards the center of the hole. Each knife 12 comprises a blade 14 mounted within the hole defined by the frame 10. As is shown, each the same plane as the frame and extends in a direction perpendicular to a radius of the same. Each blade 14 may consist of a thin lamella of metal, a metal wire or two or more metal wires extending at an angle from each other in order to form together a blade which has a pseudo-curved shape. Each blade may also consist of a thin piece of metal having a slightly curved cross-section, with extremities formed as pivots and with an elongated central slot with two cutting edges. This type of blade is actually the one that can be found in all the conventional peeling knives.

A spring 16 is mounted between the blade 14 and the inner surface of the frame 10. This spring applies a radial force onto the knives 12 and pushes the same towards the center of the hole defined by the frame 10. In practice, the spring 12 could be replaced by any similar means that would play the same role. In order to ensure proper guiding of the knives 12 in the radial direction and proper holding of the spring 16 in operative position, each knife 12 may comprise two lateral branches 20a and 20b and a central branch 22 mounted in such a manner as to be slidable within holes 24 provided with this purpose in the frame 10. The spring 16 is wind around the central branch 22.

In use, in order to peel a vegetable 18 (shown in dotted lines), one has to insert the same into the hole of the frame 10 and push it through said hole. The springs 16 bring the blade 14, which all together form a square, to penetrate under the surface of the vegetable 18, thereby allowing peeling of four opposite sides of the vegetables simultaneously.

Figure 2:
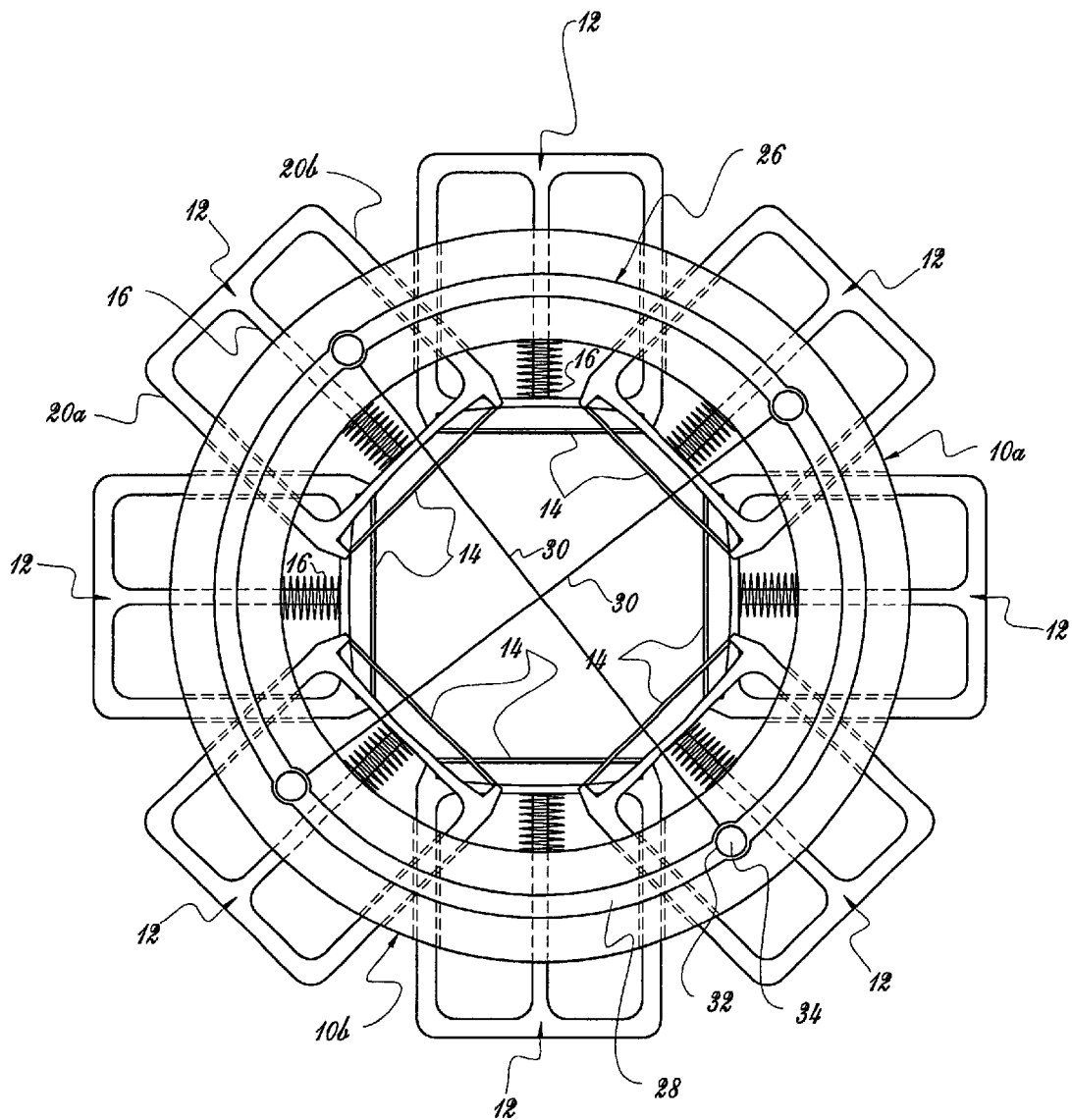
FIG. 2 is a front perspective view of an apparatus for peeling vegetables according to the second preferred embodiment of the invention, comprising two superimposed ring-shaped frames each supporting four knives, said apparatus also comprising a device for splitting the vegetables while it is peeled.

According to a second preferred embodiment of the invention shown in FIG. 2, the apparatus for peeling vegetables comprises two frames 10a and 10b which are each of a structure similar to the one of the frame 10 shown in FIG. 1. These two frames 10a and 10b are superimposed. As is shown, the frame 10 is oriented at 45° with respect to the frame 10b.

As a result, the blades 14 of knives altogether form an octagon within the hole and cover most of the circumference of the vegetables to be peeled, thereby avoiding the requirement to pass the vegetables at least twice within the apparatus after turning it at 45° as is sometimes required with the apparatus shown in FIG. 1.

Optionally, the apparatus according to the invention can be provided with a device 26 for splitting the vegetables into longitudinal parts as shown in FIG. 2. This device 26 comprises a support 28 having a shape and diameter similar to those of the frames 10a and 10b. The device 26 also comprises two blades or metal wires which form a cross and are fixed to the support 28 by their ends. Of course, the number of blades or metal wires 30 used in the device 26 and their respective orientation could differ from what is shown by way of example only in FIG. 2. Thus, by way of example, only one blade 30 could be used for splitting the vegetable into two parts. Alternatively, several blades could be used and be fixed to the support 20 in order to form a cutting grid. As is shown, the support 28 also comprises fixation means 32 for fixing the device 26 to the frame 10 or 10a by means of corresponding fixation means mounted onto one side of the frame.

In order to facilitate its operation, the apparatus for peeling vegetables according to the invention as shown in FIGS. 1 and 2 may be provided with lateral handles or be fixed within a body of cylindrical shape or of any other shape, which can be detachably fixed onto a flat working surface, such a kitchen table.

Figure 3:
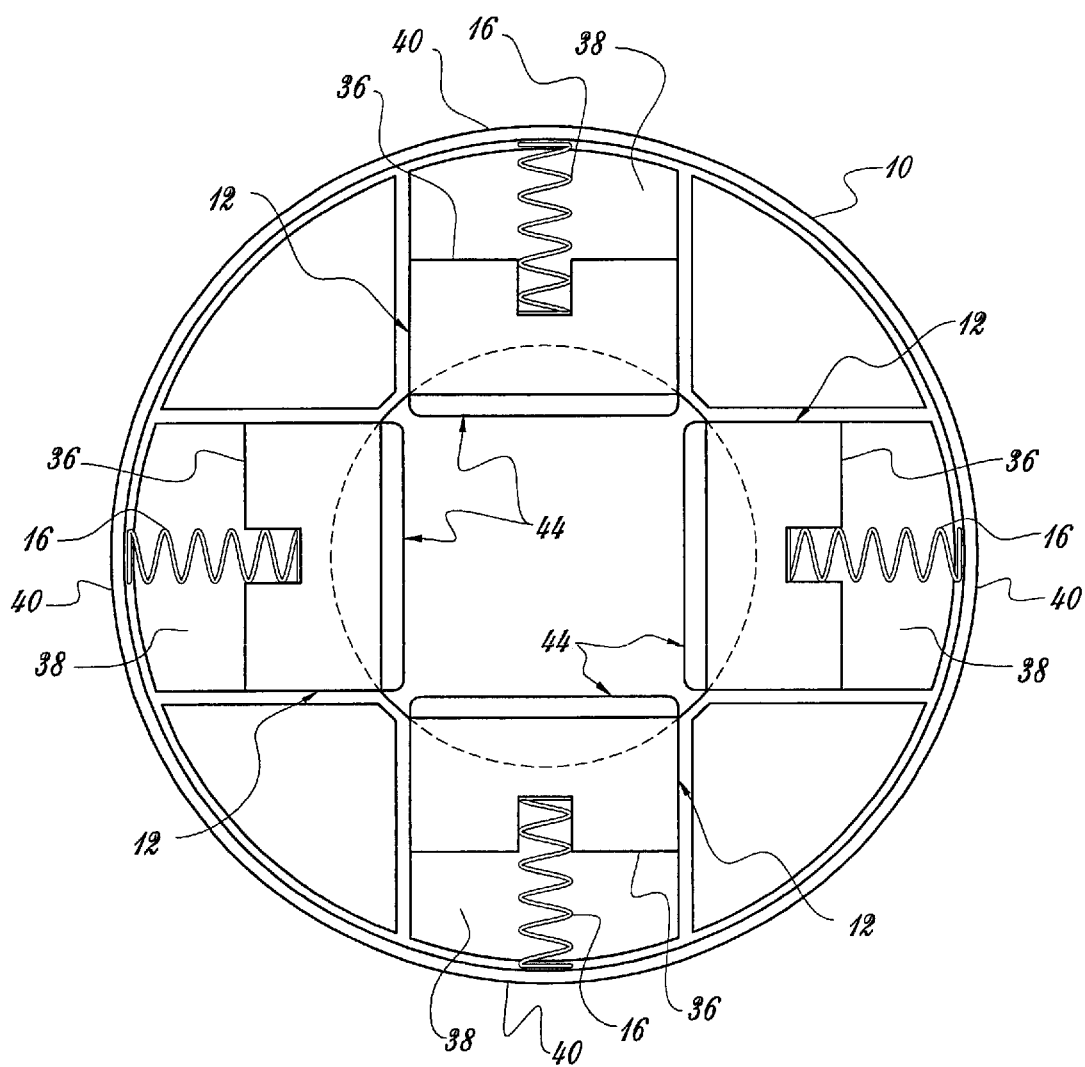
FIG. 3 is a front cross-sectional view of an apparatus for peeling vegetables according to a third preferred embodiment according to the invention, said apparatus comprising knives of a structure different from the one shown in FIGS. 1 and 2.
Figure 4:
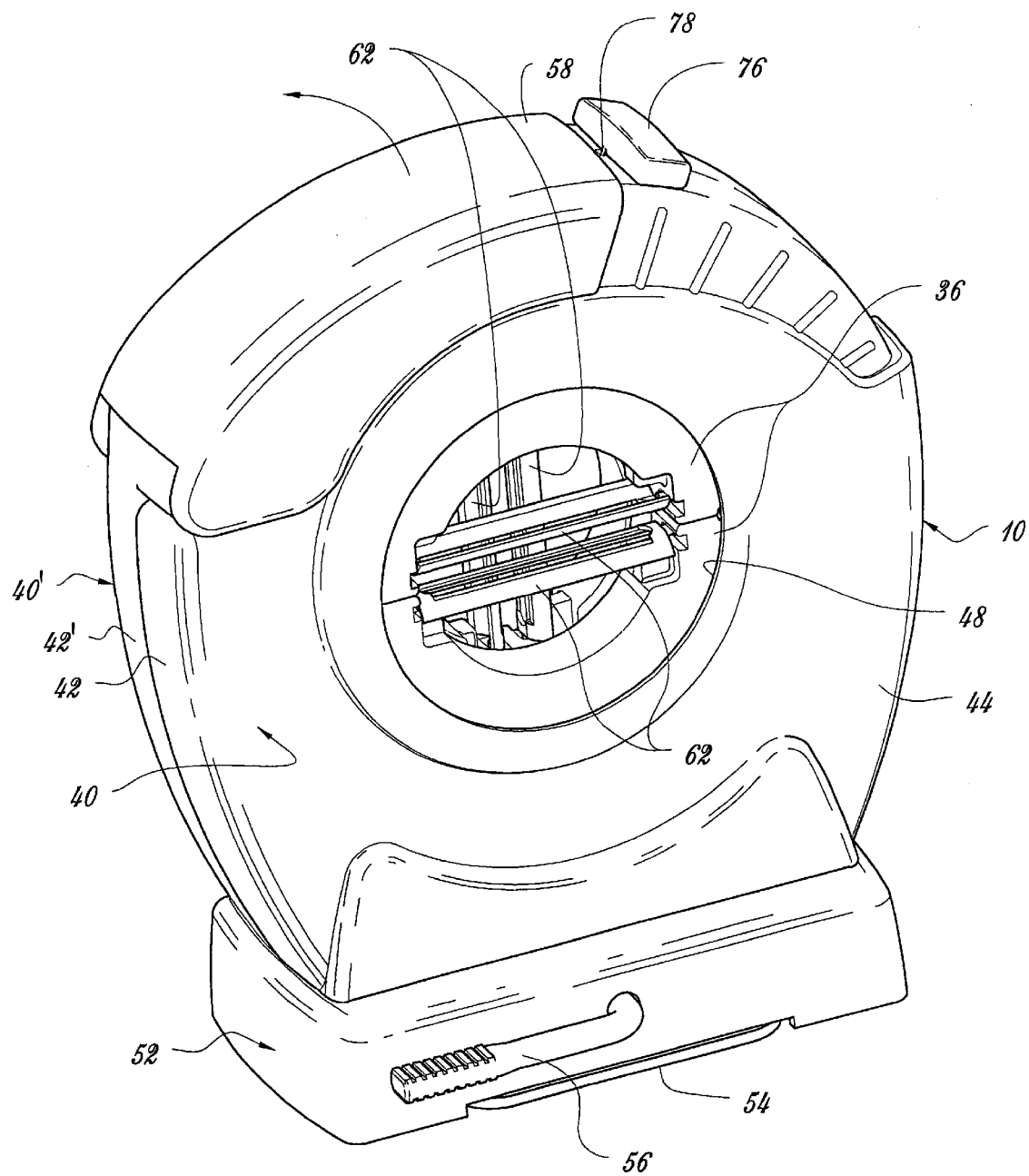
FIG. 4 is a front perspective view of an apparatus for peeling vegetables according to a fourth, particularly preferred embodiment of the invention.

A third preferred embodiment of the invention is shown in FIG. 3. In this embodiment, the apparatus for peeling vegetables comprising knives 12 of a shape different from the one shown in FIGS. 1 and 2. Each of these knives is provided with a blade 44 fixed to a rectangular block 36. Each of the blocks 36 is in slidably mounted into a radial cavity 38 provided in the ring-shaped frame 10. A spring 16 extends between the block 36 and the external edge of the frame.

Of course, the frame 10 does not need to be annular. By way of example, it could be octagonal.

A fourth particularly preferred embodiment of the invention is shown in FIGS. 4 to 8. In this fourth embodiment, the frame 10 comprises two shells 40, 40' each comprising a peripheral edge 42, 42', an external face 44, 44', an internal face 46' and a central opening 48, 48'. The internal face of each shell 40, 40' is provided with two walls 50, 50' positioned in a symmetrical manner on both sides of the central opening 48, 48' in such a manner as to define together a rectilinear channel extending transversally across the shell above the central opening of the same.

Advantageously, a base 52 is connected to the frame in such a manner as to be removably fixable onto a flat working surface such as a kitchen table, in order to rigidly hold the frame in a vertical plane and thus to facilitate operation of the apparatus. In the illustrated embodiment, the base 52 is rigidly fixed to the shell 40' and comprises a lower surface provided with a suction cup 54 operable by means of a lever 56 to reinsure the requested fixation of the base onto the flat surface. This kind of fixation is well known in the field of kitchen utensils and needs not be described in greater detail. The base 52 also acts as a support for the other shell 40 which is mounted on it by means of two pegs 41 insertable into slots 53 provided in the base for this purpose.

Figure 5:
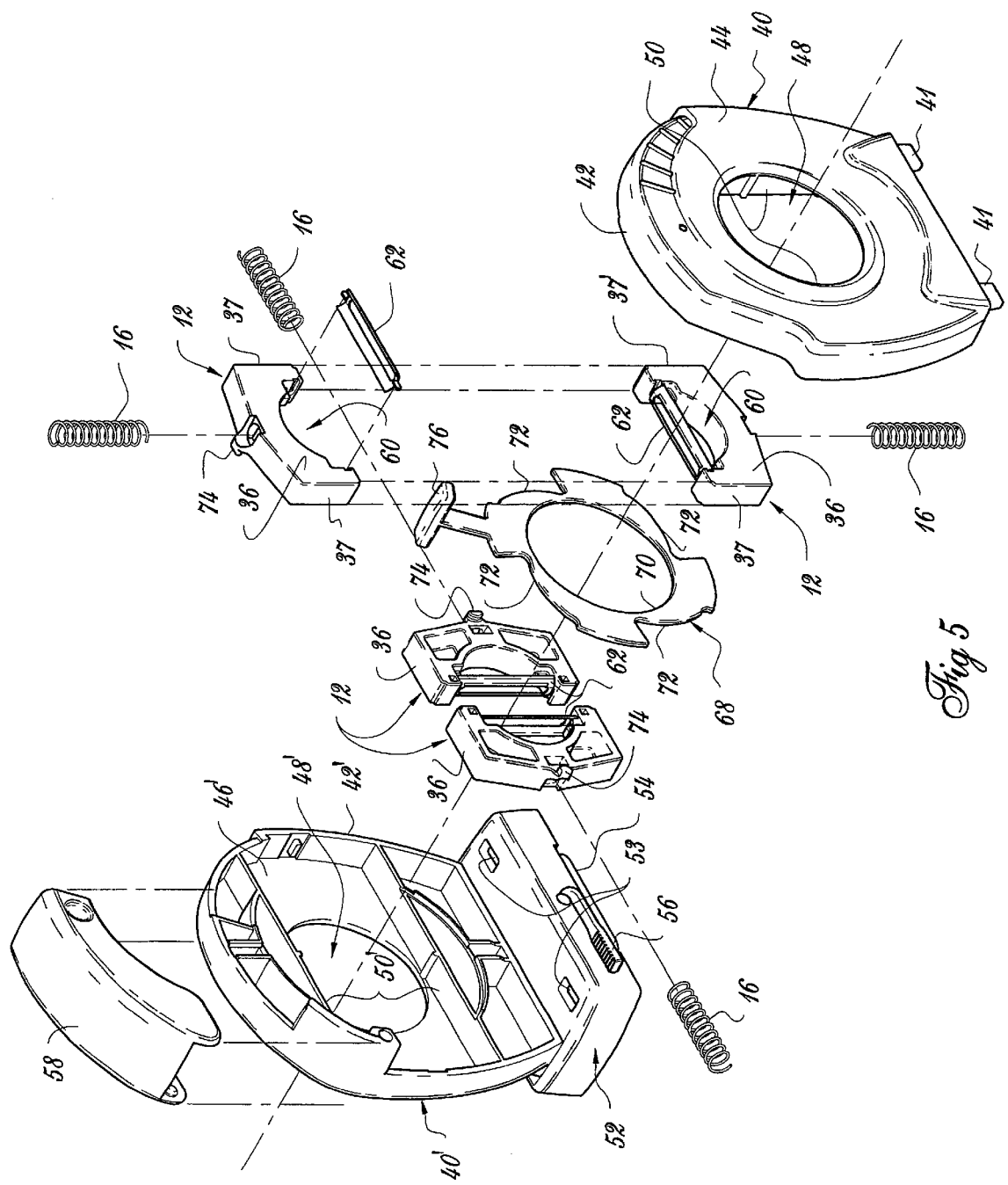
FIG. 5 is an exploded perspective view of the apparatus shown in FIG. 4.

The frame 10 also comprises means for detachably connecting the shells 40, 40' to each other in such a manner that their internal faces be in front of each other, their central openings 48, 48' be aligned to form together the hole of the frame, and their rectilinear channels defined by the walls 50, 50' be oriented at 90° with respect to each other, as can be seen in FIG. 5.

In the illustrated embodiment, the means for detachably connecting the shells to each other comprises, on the one hand, the base 52 and, on the other hand, a U-shaped piece 58 mounted in a pivotable manner onto the shell 40' so as to be opposite to the base. The U-shaped piece 58, when pivoted in lower position (see FIG. 4), fits onto both shells 40, 40' and holds them in contact to each other. This assembly is interesting in that it gives easy access to the interior of the frame to clean it and clean the pieces that it contains.

The knives 12 of the apparatus shown in FIGS. 4 to 8 each comprise a rigid block 36 sized to fit into one of the channels defined by the walls 50, 50' and to slide within the same. Each block 36 comprises two opposite flat sides 37, 37' that are in direct contact with the walls 50, 50' of the channel. Each block also comprises a rounded recess 60 facing the central opening 48, 48'.

Each of the knives 12 also comprises a blade 62 mounted in a pivotable manner across the recess 60 of the corresponding block. As is better shown in FIG. 6, each blade 62 consists of a thin piece of metal that is slightly curved in transversal cross-section. This piece has an elongated central slot 64 with a pair of opposite cutting edges 66. As previously mentioned, this type of blade 62 corresponds to the blades that are used in all the conventional peeling knives.

Springs 16 are positioned in the channels behind the blocks 36. These springs 16 bear on the peripheral edge 42, 42' of the corresponding shell 40, 40' and push the blocks 36 and the blades 62 towards the corresponding central opening 48, 48' to achieve the requested peeling.

Figure 6:
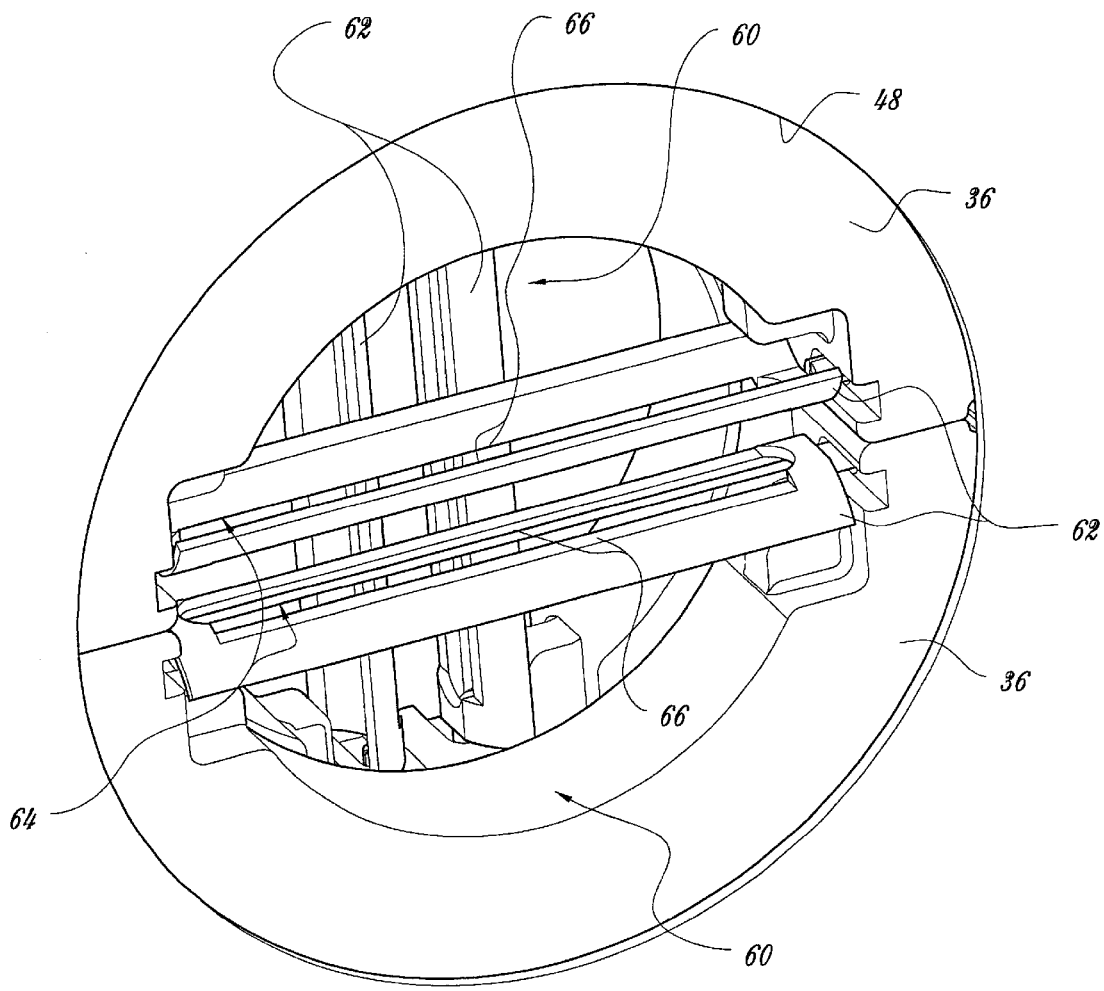
FIG. 6 is an enlarged perspective view of the central hole of the apparatus shown in FIGS. 4 and 5, this view showing in greater detail the structure and position of the blades of the knives of the apparatus.
Figure 8A:
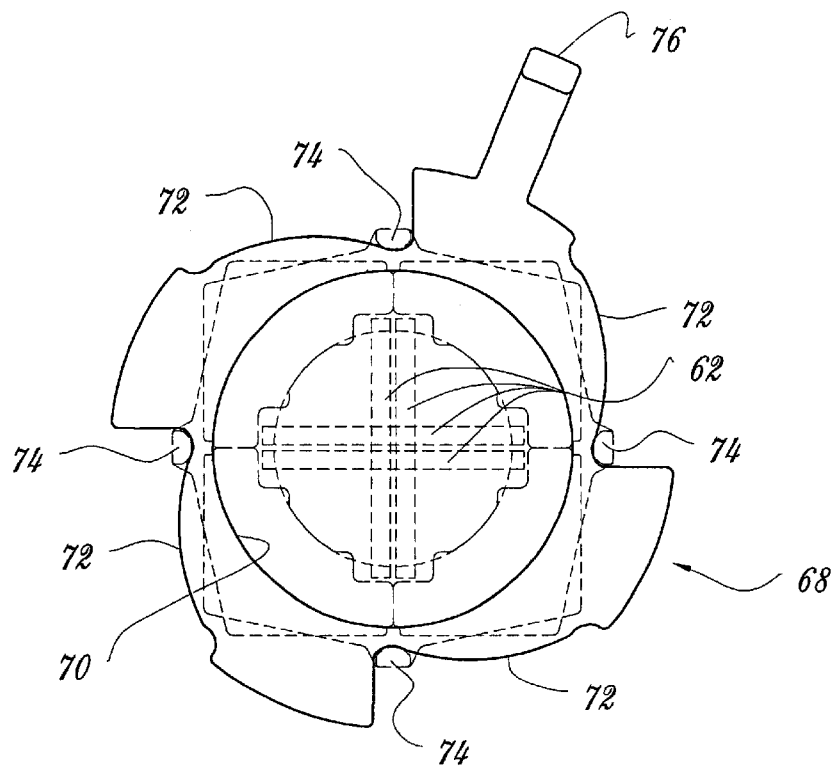
FIGS. 8a and 8b are schematic views illustrating the operation of the ring allowing manual adjustment of the distance separating the blades of the knives of the apparatus shown in FIGS. 5, 6 and 7 as a function of the size of the vegetables to be peeled.
Figure 8B:
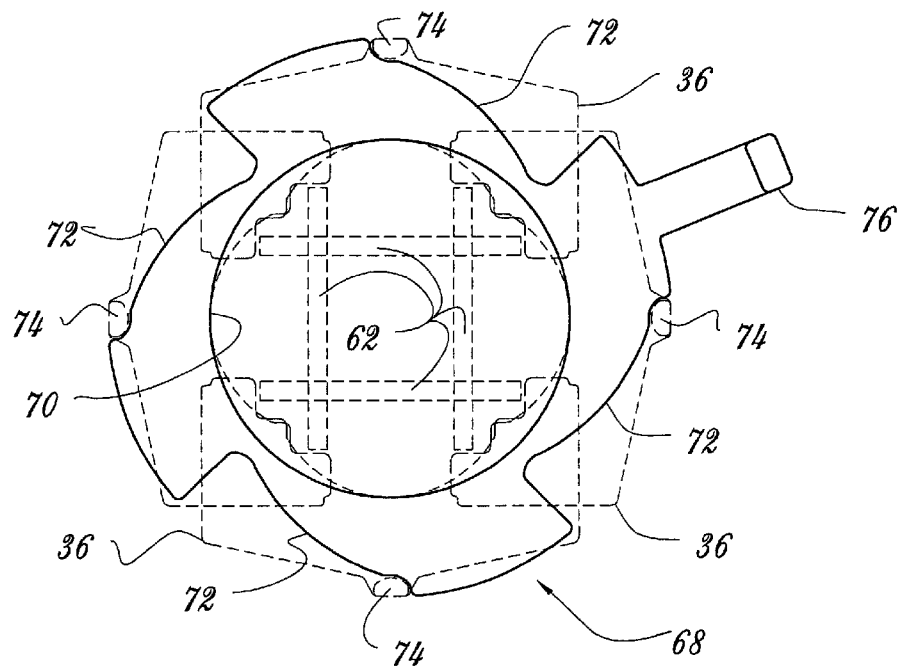

Advantageously, the apparatus according to the invention as shown in FIGS. 4 to 8 may also comprise means for adjusting the relative positions of the blades 62 within the hole of the frame as a function of the size of the vegetable to be peeled. As shown in FIGS. 5 and 6, these adjustment means comprises a flat ring 68 mounted between both shells 40, 40'. The ring 68 has an internal edge 70 defining an opening of the same size as the hole and an external edge provided with four recesses 72 that extend at 90° with respect to each other and are all inclined in the same direction. These recesses 72 act as wedges on which fingers 74 projecting form the blocks 36 of the knives 12 comes into contact. The ring 68 also comprises an operating handle 76 projecting radially from its external edge. The handle 76 passes through a slot 78 provided between the peripheral edges 42, 42' of both shells 40, 40' in order to project outwardly of the frame 10 and to permit to a user to take it and rotate the ring. In doing so, the user may force the knives to move away from the center of the hole or to move towards this center in order to adjust the respective position of the blades of the knives as a function of the size of the vegetable to be peeled (see FIGS. 8a and 8b).

Of course, numerous modifications could be made to the apparatus disclosed by way of example hereinabove without departing from the scope and spirit of the invention.

What is claimed is:

1. An apparatus for peeling vegetables of a round, oval or elongated shape, said apparatus comprising:

a frame defining a hole provided with a center, said hole being sized to receive and let pass the vegetable to be peeled;

a given number of knives mounted onto the frame in such a manner as to be radially slidable toward the center of the hole, said knives being distributed in an equal manner all around the frame and each comprising a blade extending tangentially within the hole in order to peel an adjacent part of the vegetable introduced into and pushed through the hole;

springs for applying in a permanent manner a radial force onto the knives in order to push said knives toward the center of the hole; and a device for splitting the vegetables into longitudinal parts comprising a support detachably fixable to one side of the frame and at least one blade or wire fixed to the support in such a manner as to extend across the hole when said support is connected to the frame in order to longitudinally cut the vegetable when the latter is inserted into and pushed through the hole.

2. An apparatus for peeling vegetables of a round, oval or elongated shape, said apparatus comprising:

a frame defining a hole provided with a center, said hole being sized to receive and let pass the vegetable to be peeled;

a given number of knives mounted onto the frame in such a manner as to be radially slidable toward the center of the hole, said knives being distributed in an equal manner all around the frame and each comprising a blade extending tangentially within the hole in order to peel an adjacent part of the vegetable introduced into and pushed through the hole; and springs for applying in a permanent manner a radial force onto the knives in order to push said knives toward the center of the hole, wherein:

the frame comprising two shells each comprising a peripheral edge, an external face, an internal face and a central opening, the internal face of each shell being provided with two walls positioned in a symmetrical manner on both sides of the central opening in such a manner as to define together a rectilinear channel extending transversally across the shell above the central opening of the same;

the frame also comprises means for detachably connecting the shells to each other in such a manner that their internal faces be in front of each other, their central openings be aligned to form together the hole of the frame, and their rectilinear channels be oriented at 90° with respect to each other;

each of the knives comprises a rigid block sized to fit into one of the channels and to slide within said channel, said block comprising two opposite flat sides that are in direct contact with the walls of the channel, the block also comprising a recess facing the central opening;

each of the knives also comprises a blade mounted in a pivotable manner across the recess of the corresponding block, the blade consisting of a thin piece of metal that is slightly curved in transversal cross-section, said piece also having an elongated central slot with a pair of opposite cutting edges; and the springs are positioned in the channels behind the blocks in such a manner as to contact the peripheral edge of the corresponding shell and to push the blocks towards the corresponding central opening.

3. The apparatus of claim 2, wherein the given number of knives is equal to four and the four knives are distributed in such a manner that their blades altogether form a square within the hole.

4. The apparatus of claim 2, wherein the given number of knives is equal to eight and the right knives are distributed in such a manner that their blades altogether form an octagon within the hole.

5. The apparatus of claim 2, further comprising:

a base connected to the frame and fixable in a removable manner onto a flat working surface to rigidly hold said frame in a vertical plane and thus facilitating the operation of the apparatus.

6. The apparatus of claim 5, wherein the base is fixed to at least one of the shells and comprises a lower surface provided with a suction cup operable by means of a lever to ensure fixation of said base onto the flat surface.

7. The apparatus of claim 6, wherein said means for detachably connecting the shells to each other comprises, on the one hand, the base and, on the other hand, a U-shaped piece mounted in a pivotable manner onto one of the shells so as to be opposite to the base, said U-shaped piece, when pivoted in lower position, fitting onto both shells and holding them in contact to each other.

8. The apparatus of claim 7, further comprising:

a flat ring mounted between both of said shells, said ring having an internal edge defining an opening of the same size as the hole and an external edge provided with four recesses that extend at 90° with respect to each other and are all inclined in the same direction, said recesses acting as wedges on which fingers projecting from the blocks of the knives comes into contact, said ring also comprising an operating handle projecting radially from the external edge, said handle passing through a slot provided between the peripheral edges of both shells in order to project outwardly of the frame and to permit to a user to take it and rotate the ring in such a manner as to force the knives to move away from the center of the hole or to move towards this center of the hole in order to adjust the respective position of the blades of the knives as a function of the size of the vegetable to be peeled.

9. The apparatus of claim 6, wherein the given number of knives is equal to four and the four knives are distributed in such a manner that their blades altogether form a square within the hole.

10. The apparatus of claim 8, wherein the given number of knives is equal to four and the four knives are distributed in such a manner that their blades altogether form a square within the hole.

* * * * *